Apr. 17, 1923.

C. W. KRESS

DISPLAY WINDOW

Filed April 17, 1922 — 2 Sheets-Sheet 1

1,451,778

Inventor
Claude W. Kress
By his Attorney

Apr. 17, 1923.
C. W. KRESS
1,451,778
DISPLAY WINDOW
Filed April 17, 1922  2 Sheets-Sheet 2
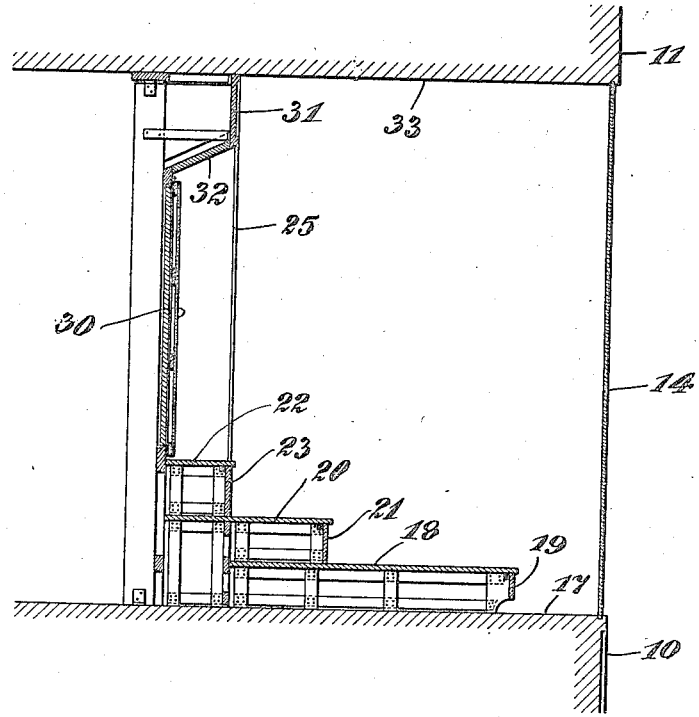
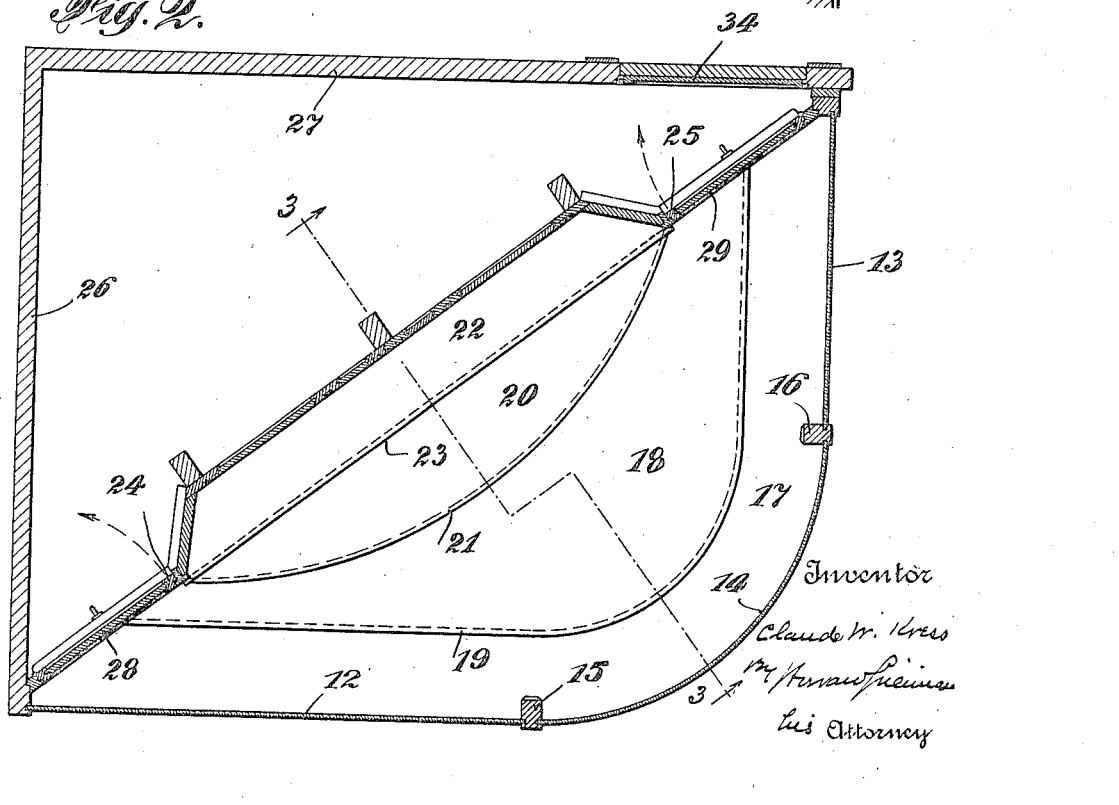

Patented Apr. 17, 1923.

1,451,778

UNITED STATES PATENT OFFICE.

CLAUDE W. KRESS, OF NEW YORK, N. Y.

DISPLAY WINDOW.

Application filed April 17, 1922. Serial No. 553,945.

*To all whom it may concern:*

Be it known that I, CLAUDE W. KRESS, a citizen of the United States, residing at New York city, county of New York, borough of Manhattan, and State of New York, have invented new and useful Improvements in Display Windows, of which the following is a full, clear, and exact specification.

My invention relates to display windows and refers particularly to exhibit window spaces.

Exhibition windows are frequently so constructed that two sides are glass covered and exposed to the street, while the two remaining back partitions are practically parallel to the glass sides.

Window spaces so constructed have the advantage of a large surface for public exposure but they possess the great disadvantage of considerable depth, due to their angular construction.

To artistically and invitingly decorate windows of this character requires a large quantity of commodities, thus reducing the store stock and, as many articles are injured by the light and exposure of window displays, a very considerable loss is occasioned.

A further disadvantage is that so many articles thus assembled cause a confusion in the mind of the observer and prevent the emphasis frequently desirable in presenting a particular class of commodities.

These and other objectionable features are incident to display windows of a practically rectangular form in which the desired exposed space is obtained by the use of two adjacent glass sides.

It is evident that this space may be reduced by a partition connecting the extremities of the glass sides, but such a partition will so reduce the exhibit space as to make it seem small, insignificant and unattractive, and hence, can not be employed with exhibition and advertising value.

I have found that the entire space of the window can be materially reduced without correspondingly reducing its visual appearance, thus overcoming the objections to the previously known display windows of this character.

My invention comprises a window display device having the appearance of much greater depth and capacity than it actually possesses.

To accomplish this desirable result, the elements of my invention are so formed and positioned as to give the appearance of deep perspective, the eye of the observer being directed toward the center of the back partition and thus diverted to a great extent from the narrow spaces at the jointures between the back partition and the glass side.

My device comprises in a broad way a plurality of ascending steps the contours of which gradually recede from the angular contour of the glass sides to a practically straight line, the steps leading upward and rearwardly toward a panel inset within a beveled frame.

The optical effect of a device constructed as above is that of a deep window, creating an appearance of much greater depth than it actually possesses.

My device, therefore, allows of the employment of a minimum of commodities with a maximum of effect and overcomes the objectionable features of previously known windows of this general character.

In the particular form of the device of my invention, shown in the accompanying drawings, similar arts are designated by similar numerals.

Figure 2 is a top plan view of Figure 1 with the ceiling removed.

Figure 3 is a section through the line 3—3 of Figure 2.

Figure 1:
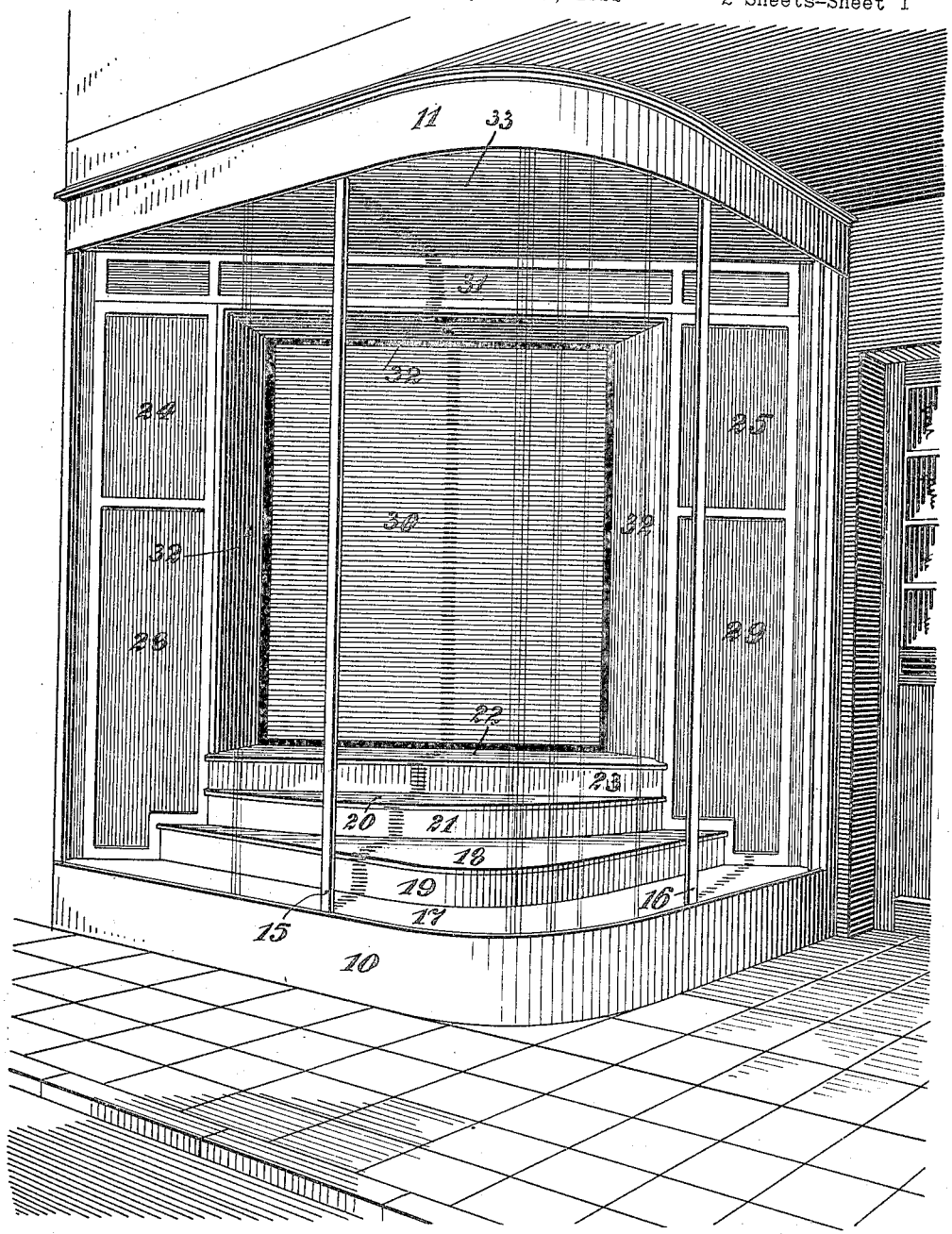
Figure 1 is a front plan view of one form of my invention.

The particular form of my invention, shown in the accompanying drawings, comprises a window base 10 and a window top cornice 11, between which are the flat glasses 12 and 13 and the curved glass 14, supported by the base 10, the top cornice 11 and the uprights 15 and 16.

The bottom 17 of the window supports a step composed of the tread 18 and the front 19, the contour of the step being approximately that of the glasses 12, 14, 13.

The tread 18 supports a step composed of the tread 20 and the front 21, the contour of the step more nearly approaching a circle than does the step 18, 19.

The tread 20 supports a step composed of the tread 22 and the front 23, the contour of the step more nearly approaching the straight line than does the step 20, 21.

The contour of the steps therefore recede consecutively from the rounded angular forward step to the straight rearward step.

The partitions 24 and 25 extend from the respective ends of the steps to the corners of the room, or window space, formed by the front glasses and the partitions 26 and 27. These partitions 24 and 25 are shown as paneled in Figure 1, the lower panels 28 and 29 being hinged to form doors to allow of entrance into the forward portion of the window space.

A rear panel 30 is connected to the sides 24 and 25 and the top cornice 31 by means of the rearwardly inclined, or beveled, frame members 32, 32, 32.

The window space has the ceiling 33 and the partition 27 has a door 34.

The optical effect of the device is that of a window space much deeper than its actual depth, due to the perspective produced by the gradual straightening of the step contours leading to the rear panel positioned within the rearwardly angularly inclined panel frame, while at the same time it allows of a very considerable storage of space behind the device, as shown in Figure 2.

The partitions, panels, frame and other portions of the device may be equipped with shelves, hooks or other suitable devices for holding the articles to be exhibited.

It is evident, therefore, that by means of the device of my invention, a comparatively shallow window space may be given the appearance of increased depth and thus allow of the use of a greatly reduced number of commodities than could be similarly employed in a space actually as large as that indicated by the perspective produced by my device.

By "adjacent glass sides" I mean glass sides meeting in angular abutment, such abutment varying from an actual angle to a gradual rounding of the angle to form a segment of a circle.

I do not limit myself to the particular size, shape, number or arrangement of parts as particularly shown and described, as these are given simply as an example for the clear description of my invention.

What I claim is:—

1. A display window comprising two adjacent glass sides, a partition connecting the two extremities of the glass sides, a floor and a plurality of steps ascending from said floor towards the central portion of the partition, the contour of each step more nearly approaching a straight line than that of the step beneath it.

2. A display window comprising two adjacent glass sides, a partition connecting the two extremities of the glass sides, a floor, a plurality of steps ascending from said floor towards the central portion of the partition, the contour of each step more nearly approaching a straight line than that of the step beneath it and a recessed panel within the partition and behind the upper step.

3. A display window comprising a curved glass front, a partition connecting the two extremities of the front, a floor and a plurality of steps ascending from said floor towards the central portion of the partition, the contour of the steps gradually receding from the contour of the front toward a straight line contour.

4. A display window comprising a curved glass front, a partition connecting the two extremities of the front, a floor, a plurality of steps ascending from said floor towards the central portion of the partition, the contour of the steps gradually receding from the contour of the front toward a straight line contour and a recessed panel within the partition behind the upper step.

5. A display window comprising two adjacent glass sides, a partition connecting the two extremities of the glass sides, a floor and a plurality of shortening steps ascending from said floor toward the central portion of the partition, the contour of each step more nearly approaching a straight line than that of the step beneath it.

6. A display window comprising two adjacent glass sides, a partition connecting the two extremities of the glass sides, a floor, a plurality of shortening steps ascending from said floor toward the central portion of the partition, the contour of each step more nearly approaching a straight line than that of the step beneath it and a recessed panel within the partition and behind the upper step.

Signed at the city of New York in the county of New York and State of New York this 13th day of April, 1922.

CLAUDE W. KRESS.